United States Patent
Nie et al.

(10) Patent No.: US 8,229,960 B2
(45) Date of Patent: Jul. 24, 2012

(54) WEB-SCALE ENTITY SUMMARIZATION

(75) Inventors: Zaiqing Nie, Beijing (CN); Ji-Rong Wen, Beijing (CN); Liu Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 12/570,023

(22) Filed: Sep. 30, 2009

(65) Prior Publication Data

US 2011/0078162 A1 Mar. 31, 2011

(51) Int. Cl.
G06F 17/00 (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| 6,356,899 | B1 * | 3/2002 | Chakrabarti et al. ......... 707/737 |
| 2008/0065623 | A1 | 3/2008 | Zeng et al. |
| 2009/0106203 | A1 | 4/2009 | Shi et al. |
| 2009/0144609 | A1 | 6/2009 | Liang et al. |
| 2009/0193328 | A1 | 7/2009 | Reis et al. |

OTHER PUBLICATIONS

Cai, et al., "Block-Based Web Search", Retrieved at <<http://research.microsoft.com/en-us/um/people/jrwen/jrwen_files/publications/block-based%20search.pdf>> In the proceedings of the 27th annual international ACM SIGIR conference on Research and development in information retrieval, Jul. 25-29, 2004, pp. 8.

Kalashnikov, et al., "Web People Search via Connection Analysis", Retrieved at <<http://ieeexplore.ieee.org/stamp/stamp.jsp?arnumber=04497193>> IEEE Transactions on Knowledge and Data Engineering, vol. 20, No. 11, Nov. 2008, pp. 1550-1565.

Pradhan, et al., "Using Semantic Representations in Question Answering", Retrieved at <<http://www.cs.colorado.edu/~martin/Papers/cuaq-icon-2002.pdf>> In the proceedings of the International Conference on Natural Language Processing, Dec. 2002, pp. 1-8.

Saggion, Horacio, "Shef: Semantic Tagging and Summarization Techniques Applied to Cross-Document Coreference", Retrieved at <<http://gate.ac.uk/sale/semeval07/papers/shef-semeval07.pdf>> In the proceedings of the 4th International Workshop on Semantic Evaluations, Jun. 2007, pp. 4.

Cheng, et al., "Falcons: Searching and Browsing Entities on the Semantic Web", Retrieved at <<http://www2008.org/papers/pdf/p1101-cheng.pdf>> In the proceedings of the 17th International Conference on World Wide Web, Apr. 21-25, 2008, pp. 1101-1102.

"EntityCube", Retrieved at <<http://research.microsoft.com/en-us/projects/entitycube/>> Aug. 7, 2009, pp. 2.

* cited by examiner

*Primary Examiner* — Isaac M Woo
(74) *Attorney, Agent, or Firm* — Gonzalez Saggio & Harlan LLP

(57) ABSTRACT

Described is a summarizing a web entity (e.g., a person, place, product or so forth) based upon the entity's appearance in web documents (e.g., on the order of hundreds of millions or billions of webpages). Webpages are separated into blocks, which are then processed according to various features to filter the number of blocks to further process, and rank the most relevant blocks with respect to the entity that remain. A redundancy removal mechanism removes redundant blocks, leaving a set of remaining blocks that are used to provide a summary of information that is relevant to the entity.

10 Claims, 3 Drawing Sheets

WEB-SCALE ENTITY SUMMARIZATION

BACKGROUND

Many web queries seek information about real-world entities, such as a person or product. Contemporary search engines are configured to return a list of webpages related to such queries.

However, the information about a single entity may appear in thousands of webpages. Thus, even if a search engine was able to find all the relevant webpages for an entity being searched for by a user, the user would need to sift through all those pages to get a thorough view of the entity. This is not practical in most cases. As a result, significant and relevant information regarding an entity is often missed by the user.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a summarization mechanism provides a summary of a web entity based upon features of blocks extracted from web documents (e.g., on the order of hundreds of millions or billions). The summarization mechanism operates by using various features within the web documents and/or their blocks, including to filter the blocks into a smaller subset. A relevance ranking mechanism uses the features to rank the blocks by relevance with respect to the entity. A redundancy removal mechanism removes redundant blocks. The remaining blocks provide a summary of information that is relevant to the entity.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards efficiently generating summaries of web entities from (typically) billions of crawled webpages. In one implementation described below, this is accomplished in part via block-based summarization, in which the crawled webpages are segmented into semantically coherent web blocks, which are then processed by a summarization algorithm. Further, entity summarization based on natural language pattern matching is used, (instead of simple key-phrase counting, for example). The entity summarization algorithm is scalable, and uses an information retrieval-based method to efficiently retrieve the most relevant information blocks for natural language pattern matching.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and information processing in general.

Figure 1:
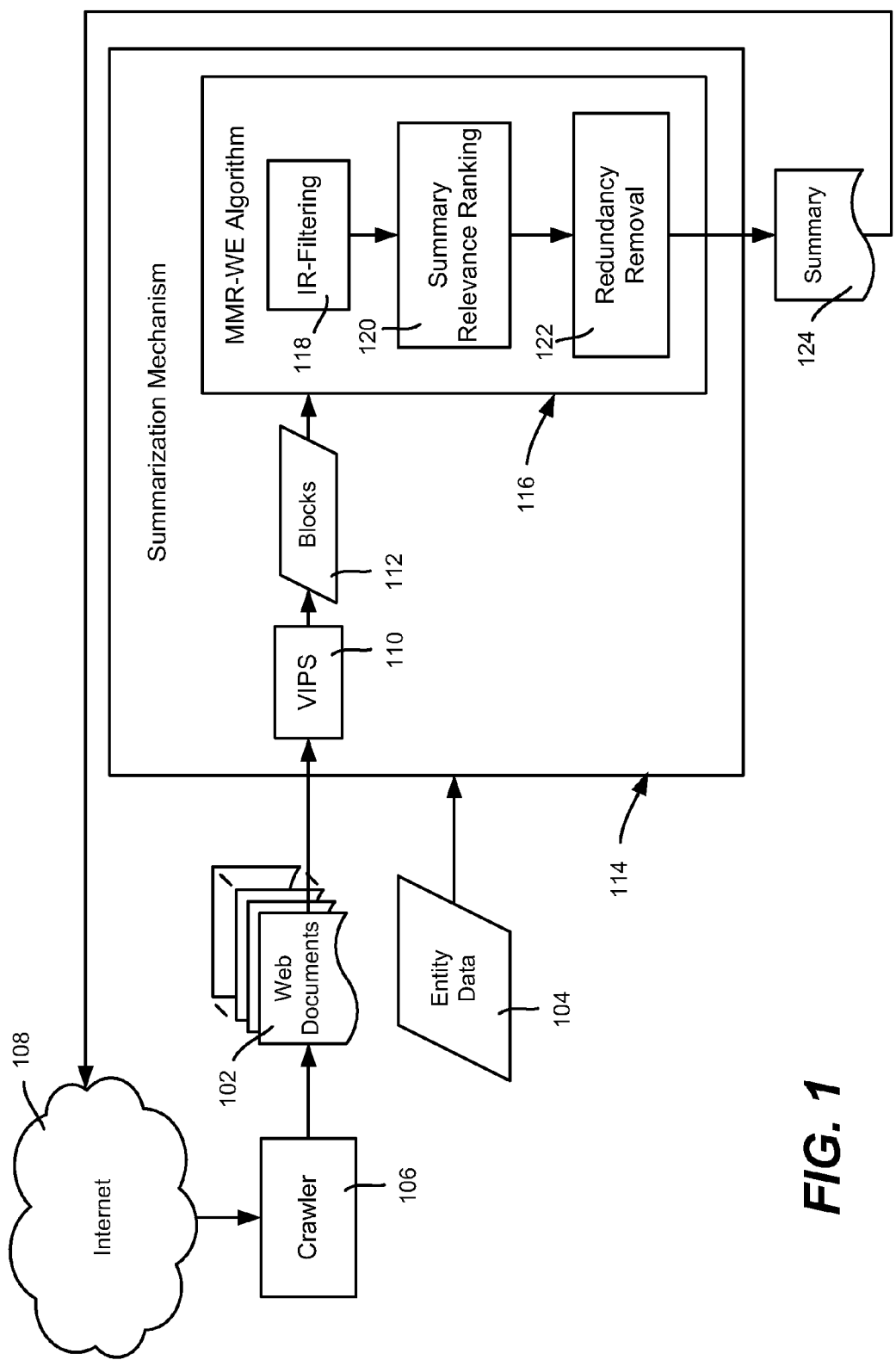
FIG. 1 is a block diagram representing example components for use in constructing a summary for webpage entities.
Figure 2:
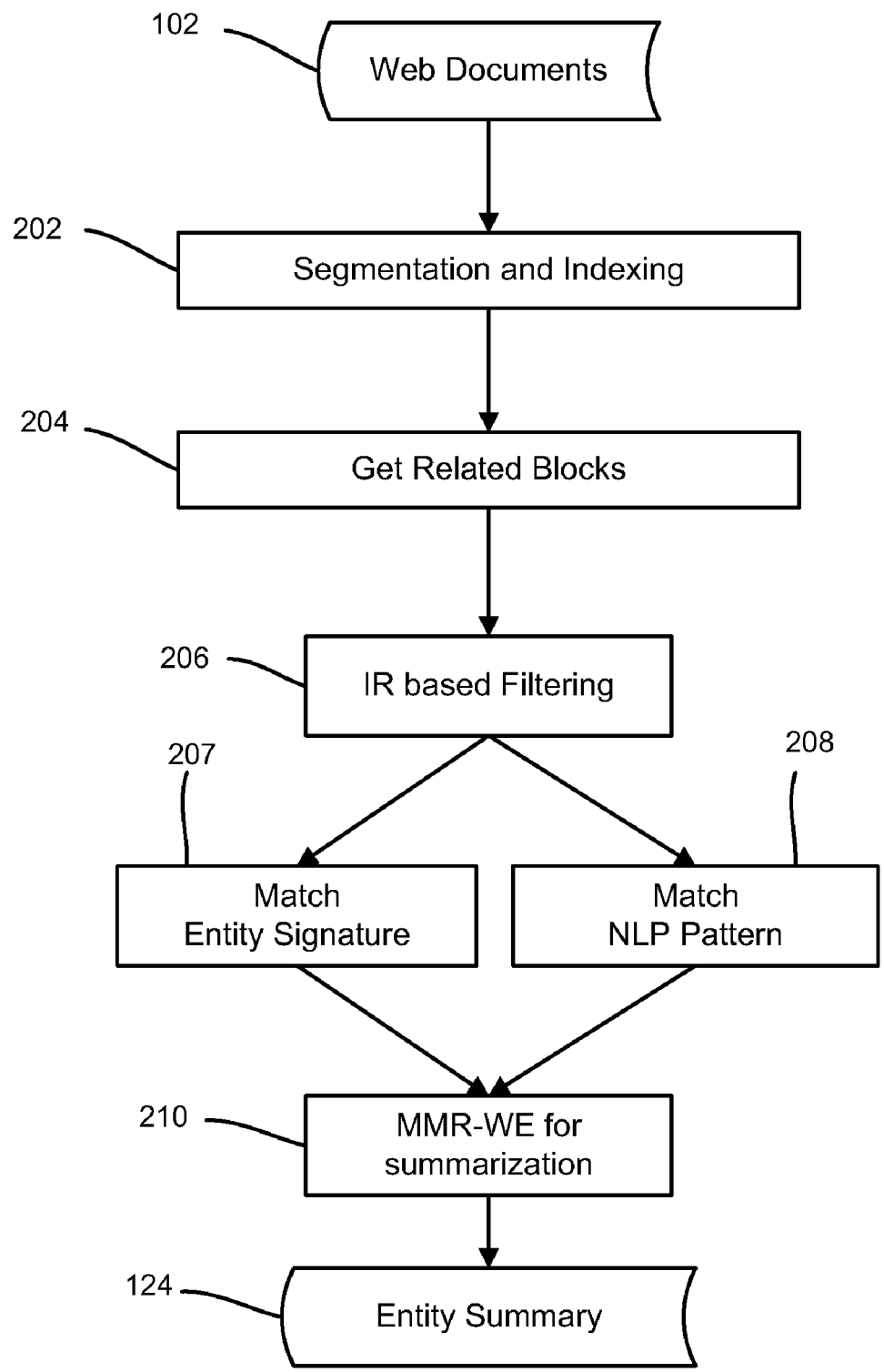
FIG. 2 is a flow diagram showing example steps that may be taken to construct a summary for webpage entities.

FIG. 1 shows a system for processing web documents 102 (webpages) to obtain a summary for an entity (corresponding to entity data 104) as described herein. FIG. 2 shows a flow diagram that represents example steps in web entity summarization.

In general, a crawler 106 obtains the web documents 102 from the Internet 108 in a known manner. As represented in FIG. 2 by step 202, segmentation is performed to segment the web pages into web blocks, which are then indexed for use.

In one implementation, the system employs an algorithm (VIPS) 110 (FIG. 1) to segment the web pages into web blocks 112. More particularly, United States Patent Application Ser. No. 20080027969, and Cai, D., Yu, S., Wen, J., and Ma, W., "*VIPS: A Vision-Based Page Segmentation Algorithm*," Microsoft Technical Report, MSR-TR-2003-79, 2003, hereby incorporated by reference, describe a vision-based page segmentation ("VIPS") technique that generates a hierarchical representation of blocks of a webpage. The VIPS technique uses page layout features (e.g., client region, font, color, and size) to construct a "vision tree" for a webpage. Unlike the well-known HTML DOM (Document Object Model) tree, each node in a vision tree represents a region on the webpage. The technique identifies nodes from the HTML tag tree and identifies separators (e.g., horizontal and vertical lines) between the nodes. The technique thus creates a vision tree that has a vertex, referred to as a block, for each identified node. The hierarchical representation of the blocks can effectively keep related blocks together while separating semantically different blocks.

Note that unlike some prior techniques that use sentences in summarization attempts, web blocks 112 are used because the entity name does not appear in every sentence, and simply collecting sentences that contain the entity's name skips substantial amounts of information. Moreover, detected blocks tend to be narrowly focused with respect to an entity, and web blocks are semantically coherent, unlike sentences combined from different webpages.

Using VIPS, a summarization mechanism 114 is able to adjust the granularity of the segmentation. As is known, web blocks can be classified into various types, including navigation bars, web page footers and information blocks. Among these different types of blocks, in one implementation only the information blocks are considered when generating an entity summary. Notwithstanding, the quality of the information blocks still varies considerably based on the content style and the appearance of the block, e.g., its size and color, its position on the whole page, and so forth.

Thus, a web page corpus used for entity summarization is parsed and segmented into web blocks by VIPS, which are then stored onto a disk or the like; any duplicate web blocks are discarded. A static rank for these blocks is calculated, with inverted entity name indices built for the web blocks while tagging them (e.g., using MSN word breaker). These inverted name indices record the name occurrence positions in each block, which makes the calculation of name relevance very efficient.

More particularly, while building a summary for an entity, the system first calculates a name relevance score according to the inverted name index. This score is combined with the block's static rank to form an information retrieval score for filtering (step 206). By selecting a suitable filtering threshold, a collection of candidate blocks of an acceptable size (e.g., relatively small) is obtained for entity summary generation. Then, the process generates an entity signature as described below and matches natural language patterns to this filtered set of blocks. Entity summaries are then generated as also described below.

Web entities are usually recognizable concepts, such as people, organizations, locations, or products which have relevance to the application domain. To make the summarization techniques applicable to all types of entities, different types of entities are considered to follow a common relational schema:

R(Entity Name, Contextual Blocks, Related Entities).

Given an entity name N and a collection of Web blocks C, the Contextual Blocks of N is the set of Blocks CB(N), where $$CB(N)=\{B|(\forall B \in C)\&\&(N \text{ appeared in } B)\}.$$

Given an entity name N and a collection of Web blocks C, the Related Entities of N is the set of entities' names RE(N'), where $$RE(N')=\{N'(\forall N')\&\&(\forall B \in C)\&\&[CB(N) \cap CB(N') \neq \emptyset]\}.$$

With the automatically mined entities and their related entities, a well-connected entity relationship graph may be constructed. Providing summaries for both the entity nodes and the relationship links of the graph gives users a more thorough understanding of a specific entity and how it is connected to other entities in the environment.

The web entity summarization task may be defined as providing descriptions for entities and entity relationships. Thus, for a specific named entity <N,CB(N),RE(N')> to be summarized, web entity summarization is directed towards finding the top-k non-redundant web blocks within CB(N) to describe the entity, and for every related entity N' RE(N'), finding the top-k non-redundant web blocks within CB(N) ∩CB(N') to describe the relationship between N and N'.

Turning to finding which blocks are most related to the entity (steps 204 and 206 of FIG. 2), in one implementation, the web entity summarization system/mechanism 114 uses a number of features as described below. To ensure the quality of the blocks, the static ranking of web blocks for web entity summarization is measured by web features and content features. Example web features of a web block include the average domain rank of the block, the occurrence time of the block on the web, and the visual features provided by the VIPS algorithm, including the position, the size, and the font of the block. The content features include the text length of the block, the average length of the natural sentences in the block and the count of named entities in the block.

To compute the static ranking of web blocks according to these types of features, a rule-based method may be used. As used herein, static_rank(B) refers to the static rank score of a specific block B.

Block relevance is another significant factor in web entity summarization. As the entity name is typically the most natural and mostly frequently used reference to a real world entity, the entity name occurrences in a block, including its frequency and positions, are information that is considered when measuring the block relevance. Name relevance is used to describe how much a block is related to a specified entity, and is determined by considering the entity name's occurrences in the block. Name relevance may be used for descriptive summaries and relationship summaries.

Single name relevance may be used for the descriptive summary generation. One way to calculate name relevance is to use a traditional relevance measure such as TF-IDF (term frequency, inverse document frequency). If used, however, all occurrences of the target entity's name in a block contribute equally to the relevance score, regardless of their positions, and further, all other entities' name occurrences are considered. This contradicts observations that show that the greater the entity name occurrence count compared with other entities, and the closer the first occurrence position of the target entity to the beginning of the block, the higher the probability that the block is mainly about the target entity, that is, has a high block relevance.

Based on such observations, single name relevance is affected by the relative count of entity name occurrences in a block compared to other entities, and the positions of these occurrences. Considering these features, single name relevance may be defined by the following formula:

$$\text{name\_relevance}(N) = Z \cdot \sum_{i=1}^{K} W(O_{N_i})$$

where K is the count of name occurrence, $W(O_{N_i})$ is a weighting function for a particular name occurrence, $O_{N_i}$ is the i-th name occurrence and Z is a normalizing factor.

More specifically, in one current implementation, W(OEi) is defined to be a step function considering the first name occurrence position, with Z used for normalizing the current entity name occurrence by the maximal entity name occurrence in the block:

$$W(O_{N_i}) = \begin{cases} \dfrac{L - Pos(N_i)}{L} & \text{if } i = 1 \\ 0 & \text{otherwise} \end{cases}$$

$$Z = \frac{K}{K_{max}}$$

where L is the length of the block, K is the count of current entity name occurrence, $Pos(_{N_i})$ is the i-th name occurrence position of N and $K_{max}$ is the maximum name occurrence count of all entities in the block.

Multi-name relevance is also defined for the relationship summary that considers two or more entities' name occurrences in a block. Similar to single name relevance, one possible calculation for multi-name relevance may use TF-IDF combined with proximity. If used, however, the name occurrences will be treated equally, whereby a large count of name occurrence of any entity in the list, or a close enough entity occurrence pair, will result in a high relevance score. This is problematic because the name occurrence count of entities should not contribute separately to the relevance score, because it ignores the absolute position information of entities in the block, and because it relies on proximity that may not be correct. For example, suppose $N_A$ occurs ten times distributed evenly in a block, but $N_B$ occurs only one time in the end of the block close to the last occurrence of $N_A$. The probability of this block describing a relationship between $N_A$ and $N_B$ is very low (namely the multi-name relevance score should be very low), however TF-IDF combined with proximity will assign a high relevance score to it.

Given the above considerations, multi-name relevance of a list of named entities {N} may be defined by the following formula:

$$\text{name\_relevance}(\{N\}) = \text{Min}(NR(N_1), \ldots, NR(N_K))$$

where K is the number of entities in list {N}, NR refers to single entity name relevance defined above.

In addition to the entity name occurrences, the context in which the target entities occur may be a useful information source for measuring block relevance. Attempts to use an entity language model have been tried under the assumption that terms co-occurring with a named entity in the same context describe it in a useful way. However, this assumption is not appropriate for block relevance calculation, because in such a model, every occurrence of every word in the candidate context (the ±n words window) contributes equally to the relevance between terms and documents. In entity summarization, the relevance between terms and entities in context are modeled more precisely instead of a 0-1 step function (the ±n words window). Furthermore, the definition of the entity language model considers only the word frequency of the target entity, which does not work very well in the web entity summarization problem.

Instead, an entity signature model is used, which is defined as a term-based entity model for web entity summarization. Unlike the entity language model which considers only the term frequencies, in the entity signature model, term frequencies are combined with their IEF (Inverted Entity Frequency) values. New score assignment functions are also defined in order to model the word frequencies more precisely.

The construction of an entity signature model is similar to constructing an entity language model, but also considers every block with the entity name in it to build the model, and calculates the term frequency weighting more precisely, via a more smoothed window (in one implementation, a triangle function) to assign weights to terms (rather than a 0-1 step function). After weighting the term frequencies, the IEF score is calculated and combined to give a final entity signature term weighting:

$$P(w \mid N) = Z \cdot IEF(N) \cdot \sum_{B \in CB(N)} WeightedTF(w, N, B)$$

where WeightedTF(w,N,B) is the weight assignment function that takes into account the occurrence position information of w and N in block B, IEF is the inverted term frequency of entity N, and Z is a normalizing factor.

The matching score of an entity signature to a block, represented in FIG. 2 via step 207, may be defined by the formula below:

$$es\_rank(N, B) = Z \cdot \sum_{w \in B} P(w \mid N)$$

For the matching of the entity signature for relationship summaries, P(w|N) is calculated by multiplying the weights of the overlapping entities signature terms in the entity list, and then applying the above function. In this way, words that are related to more of the entities in the list contribute more to the entity signature rank.

While name relevance and entity signatures help in web entity summary generation, an even more successful web entity summarization system is achieved by using natural language patterns. In addition to information contained in the entity name and its surrounding context words, people tend to favor certain semantic expressions. Such expressions may describe a relationship of the entity to other entities, or a significant attribute of the entity itself. These semantic expressions are defined herein as natural language patterns, which when considered, achieve significant improvements in entity summarization.

However, unlike the previously defined features such as static rank, name relevance and entity signature, which are domain independent and can be directly applied to different kinds of entities, the natural language patterns are domain-dependent patterns that vary when the domain changes. Manually generating natural language patterns for different domains of entities is too laborious and requires significant domain knowledge. Training natural language patterns may be possible, however such training data generally do not exist.

In one implementation that generates person summaries, a set of natural language patterns for generating entity summaries are built in a semi-automatic way. To this end, a small set of training blocks are manually labeled (e.g., for some famous person), with a natural language pattern template for a person summary defined therefor. One definition states that for a specific entity $E_A$ to be summarized, a natural language relationship pattern is a 5-tuple: <left, tag1, middle, tag2, right>, where tag1 and tag2 are entity tags of type NAME, PERSON, LOCATION, ORGANIZATION or TIME (at least 1 tag is of type NAME) and left, middle, and right are vectors associating weights with terms. A natural language attribute pattern is a 3-tuple <left, NAME, right>.

The patterns for web person summarization contain a set of different types of relationship patterns, identified by their tag combinations and an attribute pattern. For each type of relationship pattern, the text potions in every training block that match the pattern's tags are saved as pattern instances. After the pattern instances are generated, for every type of relationship pattern, a manual scan through the pattern instances may be performed to discard noisy instances. A vector of weighted keywords is calculated for the left, middle and right regions by counting the keyword frequencies of the pattern instances' left, middle and right regions. One example of a natural language relationship pattern generated is: <{ }, NAME, {<work, 0.3>, <born, 0.5>, <in, 0.5>}, LOC, {<city, 0.5>}>. This relationship pattern matches a string like "Mr. Chan was born in Hong Kong". Slight variations of strings like "Mr. Chan worked in Hong Kong for a long time" will also match the pattern to a lesser extent.

Using the semi-automatic approach described above generates natural language patterns sets for the descriptive summary and the relationship summary using different sets of manually selected training blocks.

In order to match a new block to the patterns generated (step 208 of FIG. 2), the text potions in the block that fit the tags are converted into the same 5-tuple format as the pattern, with a matching score calculated, e.g., as:

The degree of match Match($t_p$, $t_s$) between two 5-tuples $t_p$=<$l_p$,$t_1$,$m_p$,$t_2$,$r_p$> (with tags $t_1$ and $t_2$) and $t_s$=<$l_s$, $t_1$', $m_s$, $t_2$', $r_s$> (with tags $t_1$' and $t_2$') is defined as:

$$Match(t_p, t_s) = \begin{cases} l_p l_s + m_p m_s + r_p r_s & \text{if the tags match} \\ 0 & \text{otherwise} \end{cases}$$

The matching score of a block to the patterns is obtained by adding the text potion matching scores inside this block. One definition is given as the formula below:

$$nlp\_rank(N, B) = \sum_{T_i \in \{T\}_B} \sum_{P_j \in \{P\}} Match(T_i, P_j)$$

where $\{T\}_B$ refers to the text potions that match the tag requirements and $\{P\}$ refers to the pattern set to be matched.

With the above description, further described herein is an Information Retrieval-based algorithm that combines the above-described features to produce non-redundant web entity summaries at a web scale. Note that in general, for multiple document summarization, redundancy needs to be avoided when generating summaries. However, redundancy is problematic because the web itself is highly redundant.

MMR is a known metric that produces data that emphasize "relevant novelty," a metric for minimizing redundancy and maximizing relevance. A first approximation to measuring relevant novelty is to measure relevance and novelty independently and provide a linear combination as the metric. A formal definition of MMR is as the following formula:

$$MMR \stackrel{def}{=} \operatorname*{Arg\,max}_{B_i \in R \setminus S} \left[ \lambda \left( Sim_1(N, B_i) - (1-\lambda) \max_{B_j \in S} Sim_2(B_i, B_j) \right) \right]$$

in which N is the entity to be summarized, B and are the candidate blocks, $Sim_1$ is the relevance measure, and $Sim_2$ is the redundancy measure.

In order to reduce the time complexity of known MMR techniques, described herein is MMR-WE (Maximal Marginal Relevance Web Entity), a two-step process, that first gives an overall ranking of candidate blocks by measuring their relevance to be selected as summary blocks to the target entity N. Then a top down redundancy check process is conducted to generate a non-redundant entity summary.

With respect what is meant by relevance and redundancy, relevance is a similarity metric used for calculating the relevance ranking of web blocks to a web entity. Redundancy is used to measure the similarity of a web block to the previously selected blocks.

For relevance, in one implementation, one term is the name relevance of the block to the target entity, and another term is the static rank of the block. A third term is the Jensen-Shannon distance of the block to target entity language model, and a fourth term is the matching score of the block to a natural language pattern set trained for entity summarization. This similarity score $Sim_1$ is a linear combination of the above-described terms, with the scores normalized by $w_1$-$w_4$ before the combination:

Relevance($N$,$B$)=$w_1$*name_relevance($N$,$B$)+
$w_2$*static_rank($B$)+$w_3$*es_rank($N$,$B$)+
$w_4$*nlp_rank($N$,$B$).

With respect to a redundancy definition, a first term uses the cosine similarity metric to compute the similarity between the block and previously selected blocks; this helps the system to minimize the possibility of including blocks similar to ones already selected. A second term penalizes blocks containing entity signature terms that have already been considered in previously selected blocks. A third term penalizes blocks that contain natural language patterns that have already been considered in previously selected blocks:

Redundancy($B_i$, $B_j$) =
   $w_a$ * cosin($B_i$, $B_j$) + $w_b$ * es_selected($B_i$) + $w_c$ * nlp_selected($B_i$)

Redundancy($B$, $S$) = $\max_{B_i \in S}$(Redudancy($B$, $B_i$))

Given the above definitions of relevance and redundancy, one web entity summarization algorithm corresponding to MMR-WE is set forth below; this algorithm integrates the IR-filtering process and the summarization process. The algorithm is represented in FIG. 1 by the block labeled 116, and in FIG. 2 by step 210.

Lines 1 to 4 comprise the IR-filtering process, shown in FIG. 1 via the block labeled 118. Lines 5 to 10 comprise the summary relevance ranking computation/process, shown in FIG. 1 via the block labeled 120. Lines 11 to 19 comprise the redundancy removal computation/process, shown in FIG. 1 via the block labeled 122. When completed, the summary 124 is returned (line 20), and, for example, may be made available on the Internet.

```
Algorithm MMR-WE (N,CB(N), m, k)
             //N:a single entity name or a set of related entity names;
             // m: top-m blocks after IR-based summary;
             //k:top-k blocks for final summary;
    1    for (each block B in CB(N))
    2       IR_score(B) ← α * name_relevance(B, N) + i.
             (1-α)*static_rank(B);
    3    end for
    4    CB(N)_filtered ← top-m blocks ranked by IR_score;
    5    for (every B in CB(N)_filtered)
    6       NLP_score(B) ← nlp_rank(N,B);
    7       ES_score(B) ← es_rank(N,B)
    8       Relevance(B) ←Relvance(N,B);
    9    end for
   10    Rank CB(N)filtered by Relevance(B) of every B in it
   11    i←0;
   12    S←ø; //S is the set of selected blocks
   13    for (every B in CB(N)filtered )
   14       Calculate Redundancy(B,S);
   15          if ( Redundancy(B,S) < R_Threshold )
   16             S←S∪{ B};
   17             CB(N)_filtered ← CB(N)_filtered −{B_selected};
   18          end if
   19    end for
   20    return S;
End MMR-WE;
```

Exemplary Operating Environment

Figure 3:
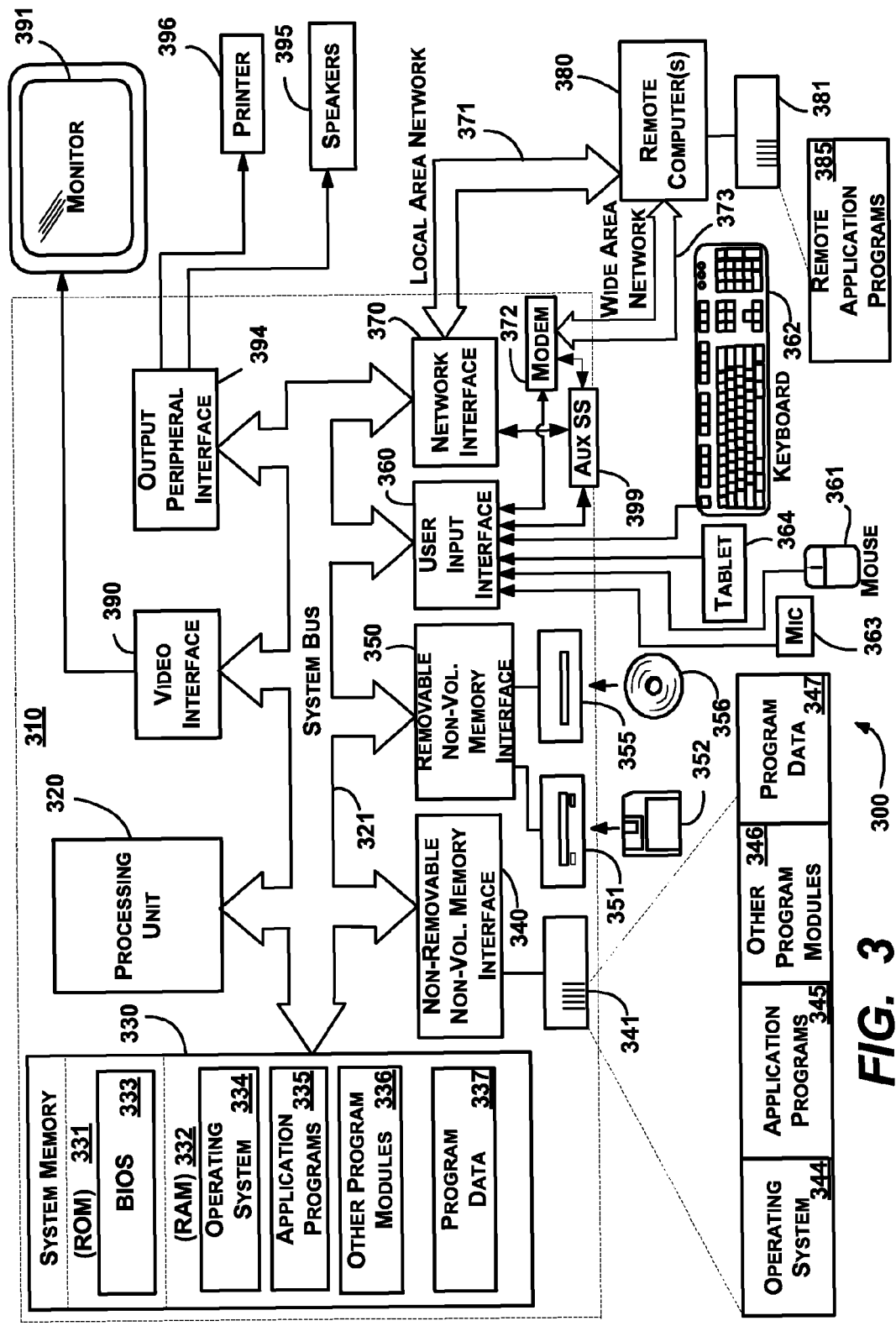
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising, a summarization mechanism configured to provide a summary of a web entity based upon features of blocks within web documents, the summarization mechanism including a filtering mechanism configured to use at least some of the features to filter the blocks, a relevance ranking mechanism configured to use at least some of the features to rank the blocks, and a redundancy removal mechanism configured to remove redundant blocks by at least one of determining similarity between a selected block and any previously selected block or blocks, determining an entity signature term or terms of the block that correspond to any entity signature term or terms of any previously selected block or blocks, or determining one or more natural language patterns in the block that correspond one or more natural language patterns in any previously selected block or blocks.

2. The system of claim 1 wherein the features include a name relevance score and a static rank for each block.

3. The system of claim 1 wherein the features include web features for each block, including an average domain rank, an occurrence time of that block on the web, or visual features including position, size, and font data for that block, or any combination of an average domain rank, an occurrence time, or visual features.

4. The system of claim 1 wherein the features include content features for each block, including an average length of natural sentences in each block and a count of named entities in each block.

5. The system of claim 1 wherein the relevance ranking mechanism is further configured to use a name relevance score based on the entity name's occurrences in a block, including its frequency and position or positions therein.

6. The system of claim 5 wherein the name relevance includes a single name relevance score and a multi-name relevance score.

7. The system of claim 1 wherein the summarization mechanism is further configured to obtain the blocks from a vision-based page segmentation algorithm.

8. One or more computer-readable media having computer-executable instructions, which when executed perform steps, comprising:
   filtering blocks with respect to an entity into a set of filtered blocks, the blocks obtained from web documents;
   ranking the filtered blocks based upon relevance data into a set of selected blocks, wherein ranking the filtered blocks based upon relevance data comprises determining at least one of a ranking score for each block based upon name relevance data of the block to the target entity, a static rank of the block, a distance measure of the block to target entity language model, or a matching score of the block to a natural language pattern set;
   removing blocks that are redundant from the set of selected blocks; and
   providing a summary for the entity based upon the blocks that remain after removing blocks that are redundant.

9. The one or more computer-readable media of claim 8 wherein the filtering the blocks comprises selecting blocks based upon an information retrieval score.

10. The one or more computer-readable media of claim 8 wherein removing blocks that are redundant comprises, computing a score for each block based upon: a) a similarity computation between a block and any previously selected block or blocks, b) any entity signature term or terms of the block that correspond to any entity signature term or terms of any previously selected block or blocks, or c) one or more natural language patterns in the block that correspond one or more natural language patterns in any previously selected block or blocks, or any combination of a), b) and c).

* * * * *